United States Patent [19]

Rose et al.

[11] Patent Number: 4,704,533

[45] Date of Patent: Nov. 3, 1987

[54] INFRARED INTRUDER DETECTION SYSTEM

[75] Inventors: Michael A. Rose, Winchester; Paul Kidson, Southampton, both of England

[73] Assignee: U.S. Philips Corporation, New York, N.Y.

[21] Appl. No.: 849,603

[22] Filed: Apr. 8, 1986

[30] Foreign Application Priority Data

Apr. 15, 1985 [GB] United Kingdom ................. 8509627

[51] Int. Cl.[4] ................................................ G01J 5/18

[52] U.S. Cl. ..................................... 250/342; 250/349

[58] Field of Search ............. 250/392, 338 R, 338 PY, 250/349; 340/567, 371, 815.21, 815.22

[56] References Cited

U.S. PATENT DOCUMENTS

| | | | |
|---|---|---|---|
| 4,342,987 | 8/1982 | Rossin | 340/567 |
| 4,364,030 | 12/1982 | Rossin | 340/567 |
| 4,570,157 | 2/1986 | Kodaira | 340/567 |
| 4,614,938 | 9/1986 | Weitman | 340/567 |
| 4,618,854 | 10/1986 | Miyake et al. | 340/567 |

FOREIGN PATENT DOCUMENTS

| | | | |
|---|---|---|---|
| 0182522 | 10/1983 | Japan | 250/338 PY |
| 2046431 | 1/1980 | United Kingdom . | |
| 1580403 | 12/1980 | United Kingdom . | |

*Primary Examiner*—Janice A. Howell
*Assistant Examiner*—Constantine Hannaher
*Attorney, Agent, or Firm*—Marc D. Schechter

[57] ABSTRACT

An infrared intruder detection system has two separate channels A and B. Each channel has its own pyroelectric detector device and threshold level comparator. The comparator is responsive to dual polarity pyroelectric voltage outputs produced by the associated detector device as a result of an intruder-related infrared image moving thereacross. A logic circuit analyzes the comparator outputs and responds to the identification of particular intruder-indicative sequences of comparator outputs in both channels to generate an alarm and/or switching output. The logic circuit may also identify shock-induced comparator outputs. The system offers a high intruder detection capability with immunity from false triggering.

11 Claims, 5 Drawing Figures

INFRARED INTRUDER DETECTION SYSTEM

BACKGROUND OF THE INVENTION

This invention relates to an infrared intruder detection system, and in particular to an infrared intruder detection system comprising first and second separate channels A and B. Each channel has a pyroelectric detector device responsive to infrared radiation. The radiation receiving areas of the devices are closely spaced. Each channel also includes level detector means responsive to a predetermined output level of one polarity produced by the respective pyroelectric detector device as a result of an infrared image moving thereacross. The level detector provides an output signal when the detector device output attains the predetermined level. The detection system further includes circuit means for monitoring output signals of the level detector means in both channels, and for providing an output when output signals are produced in both channels.

The output from an intruder detection system of this kind may be used to generate an alarm in response to the detection of an intruder. The intruder acts as a moving source of infrared radiation crossing the field of view of the pyroelectric detector devices, thus causing the pyroelectric detector devices to produce outputs whose magnitudes exceed the predetermined levels of the level detector means.

The system may be used for other movement sensing purposes, for example in remote switching applications for sensing the presence of a person in a room and responding thereto to switch lights on or off. The term "intruder" should therefore be construed accordingly.

Two, separate, channels are provided in this known system in order to reduce the risk of false triggering. Factors such as electrical noise within pyroelectric detector circuits, or external, non-intruder related infrared radiation sources may cause the pyroelectric detector circuits to produce spurious outputs which could give rise to a misleading output. By employing two channels, each having its own pyroelectric detector device, and by requiring that intruder indicative outputs from both detector devices are needed in order for this system to respond, the risk of false triggering is considerably reduced. This is because the likelihood of spurious, intruder simulating noise signals occuring in both channels in such a manner to produce system response is remote.

Thus, the two channel system allows an alarm to be generated, or a switching function to be performed, on the basis of signal information in both channels. Noise interference in one channel only will generally not induce a reaction from the system. A situation where, say, noise spikes occur in both channels simultaneously or almost simultaneously would be very unlikely in view of the random nature of such noise spikes.

Besides having some immunity from false triggering, it is desirable of course that an intruder detection system be able to respond reliably to the presence of an intruder.

While the known system has improved false triggering immunity compared with earlier known single channel systems, it has been found that, in use, it can still sometimes prove unreliable in successfully detecting intruders.

SUMMARY OF THE INVENTION

It is an object of the present invention to provide an infrared intruder detection system which can respond even more reliably to intruders and in which the likelihood of false triggering is reduced still further.

According to the present invention an infrared intruder detection system comprises first and second separate channels A and B. Each channel has a pyroelectric detector device responsive to infrared radiation. The radiation receiving areas of the devices are closely spaced. Each channel further includes level detector means responsive to a predetermined output level of one polarity produced by the respective pyroelectric detector device as a result of an infrared image moving across the detector device. Each level detector provides a respective output signal when the detector device output attains the predetermined level. The system further includes circuit means for monitoring output signals of the level detector means in both channels, and for providing an output when output signals are produced in both channels.

In the detection system according to the invention, the level detector means of each channel is responsive to predetermined output levels of both positive and negative polarity produced by the respective pyroelectric detector device as a result of an infrared image moving across the detector device. As a result, the level detector means of both channels provide output signals, herein referred to as +A, −A, +B, −B, when the detector device outputs attain predetermined positive and negative levels in channels A and B, respectively. The circuit means for monitoring the level detector means' output signals is arranged to provide an output in response to predetermined patterns of output signals indicative of an intruder-related infrared image moving across the pyroelectric detector devices of both channels. The patterns comprise either (i) +A, followed by +A together with +B, followed by +B, or (ii) −A, followed by −A together with −B, followed by −B.

Such a system, by looking for both polarity outputs from the detector devices, and by responding to particular patterns of output signals from the level detector means (rather than by looking simply at one polarity outputs from the detector devices and responding merely to the existence of output signals in both channels as with the aforementioned known system), has been found to offer greater reliability in intruder detection and greater immunity from false triggering. This system according to the invention is therefore a significant improvement over the earlier known system.

As an intruder moves across the field of view of the two pyroelectric detector devices of the system, the infrared image of the intruder presented to the devices (which may be collected and focussed by means of, for example, a mirror or lens arrangement) moves across the devices correspondingly. Because the two devices are separate, there is typically a small delay between the point in time the image first falls on the radiation receiving sensitive area of the one device and the point in time the image falls on the radiation receiving sensitive area of the other device. Thus, for example, the detector device of channel A will respond to produce an intruder-indicative output shortly before the detector device of channel B. By making the physical separation of the two detector devices as small as possible, the time delay is minimized and may in certain cases be almost negligible.

The system according to the invention uses to advantage the fact that a pattern, or sequence, of the output signals of, for example, the positive excursion parts of the level detector means in channels A and B is produced in response to an intruder moving across the detector devices' field of the view. The pattern may be (i) +A, as the image falls upon the sensitive area of the detector device of channel A, followed by (ii) +A together with +B as the image moves also onto the sensitive area of the detector device of channel B, (bearing in mind that the sensitive areas of the devices are spaced close together and that the size of the focussed image presented is sufficient to cover at least parts of the sensitive areas of both detector devices simultaneously), followed by (iii) +B as the image moves from the detector device of channel A solely onto the sensitive area of the device of channel B.

The system, in having level detector means associated with each channel which respond to predetermined output levels of both polarity from the detector device concerned, is able to respond more reliably to the presence of a moving intruder. An infrared radiation image passing onto the temperature-change responsive pyroelectric material of the detector device will cause a voltage to be developed across electrodes on the pyroelectric material. This voltage is fed via an associated impedance matching circuit, typically comprising a low-noise FET, to provide an output. As the infrared image moves off the pyroelectric material a voltage of opposite polarity is developed. This latter voltage is again fed via the impedance matching circuit to provide a further output.

Hence each crossing of the detector device by an infrared image produces dual polarity output voltages. Following amplification, the detector device's output voltages are passed to the associated level detector means, comprising for example a positive and negative threshold level detector. The threshold detector responds to predetermined levels of positive and negative output voltages to generate digital pulse signals in accordance therewith for analysis by the circuit means. By looking at both the positive and negative detector device output voltages produced in response to a single infrared image, the system is able to detect intruders with a higher degree of reliability than, for example, a system employing either a positive or a negative level threshold detector alone. If the system fails for some reason to respond to an intruder's image passing onto the detector devices, it can still respond to the opposite polarity output voltages produced as the image passes off the detector devices.

The circuit means is preferably further arranged to provide an output in response to predetermined patterns of output signals from the level detector means of both channels comprising either +B, followed by +B together with +A, followed by +A, or −B, followed by −B together with −A, followed by −A. In this way, the system advantageously is able to detect and respond to an intruder moving in the opposite direction, wherein the intruder's image passes correspondingly over the detector devices in the opposite direction.

The circuit means for monitoring output signals of the level detector means is preferably further arranged so as to provide an output also in response to any one of the following additional patterns of output signals from the level detector means of both channels:

(a) +A, followed by +A together with +B, followed by +A and (b) −A, followed by −A together with −B, followed by −A.

Surprisingly, it has been found that by looking for these additional, unexpected patterns the system in use has proved to be even more reliable in detecting intruders. Whereas it may be thought that looking for the first-mentioned patterns of level detector means output signals should be sufficient to readily identify an intruder, tests have revealed that as a result of arranging the circuit means so as to look for and respond to these additional patterns of output signals from the level detector means in both channels, the system is actually more effective and more reliable in detecting and responding to intruders to provide an output in accordance therewith.

Preferably, the circuit means further is arranged to provide an output also in response to any one of the following patterns of output signals from the level detector means of both channels:

(a) +B, followed by +A together with +B, followed by +B, and (b) −B, followed by −A together with −B, followed by −B.

This has the advantage of enabling the system to detect movement of an intruder in the opposite direction as well, that is, with the intruder's image passing first onto the detector device of channel B and then onto the detector device of channel A.

The circuit means may further be arranged to inhibit generation of an output if a combination of output signals −A together with +B, or +A together with −B occurs. In this way, the risk of false triggering of the system as a result of mechanical shock to the detector devices is reduced. As is well known, pyroelectric material, by virtue of the fact that it also has piezoelectric properties, is sensitive to mechanical shock, whereby the detector devices, when subjected to mechanical shock, produce outputs similar to those associated with intruder images. With the known system, there exists a real risk of false triggering through mechanical shock. However, the aforementioned combinations of output signals have been identified as the kinds of signals typically generated through mechanical shock. By looking for these particular combinations and operating in response to detection of such combinations in effect to ignore the sequence of signals in which they are contained, the system is able to discriminate to some extent the effects of mechanical shocks and thus offers a higher degree of immunity from false triggering as a result of mechanical shocks.

The circuit means preferably also includes a timing arrangement which, in response to an output signal from either level detector means (+A, −A, +B, −B) defines a timing period window for generation of the output. Only if the predetermined patterns of output signals occur within the timing period, an output is generated. The timing period window, being of a duration sufficient to allow an intruder's image to pass over both detector devices but not significantly longer, helps prevent false triggering of the system by necessitating that the required, intruder-related pattern of signals be detected within a predefined time interval. As a result, the likelihood of spurious signals, for example resulting from noise, causing triggering is reduced.

The radiation receiving areas of the detector devices, defined by respective pyroelectric elements may be interdigitated so as to occupy a substantially common area. This ensures that the detector devices respond very nearly simultaneously to an incoming infrared radiation image. It also enables the timing period window to be kept to a minimum.

Each of the pyroelectric detector devices may comprise a so-called "dual" detector device having two pyroelectric elements differentially connected. In this way, uniform changes in input radiation in the fields of view of both elements (for example resulting from changes in ambient temperature, background radiation or acoustic noise) will produce voltages across both elements. Since the two elements of each pair are connected differentially, the voltages cancel out one another. In contrast, a change in input radiation in the field of view of just one element produces a differential output voltage. Hence, immunity is provided from common mode signals produced by effects such as those mentioned, thereby increasing the overall immunity of the system from false triggering.

In this embodiment the four elements of the two dual detector devices may be arranged in a linear array with one element of one detector device being positioned closely adjacent to, or interdigitated with, one element of the other detector device.

DESCRIPTION OF THE PREFERRED EMBODIMENTS

Figure 1:
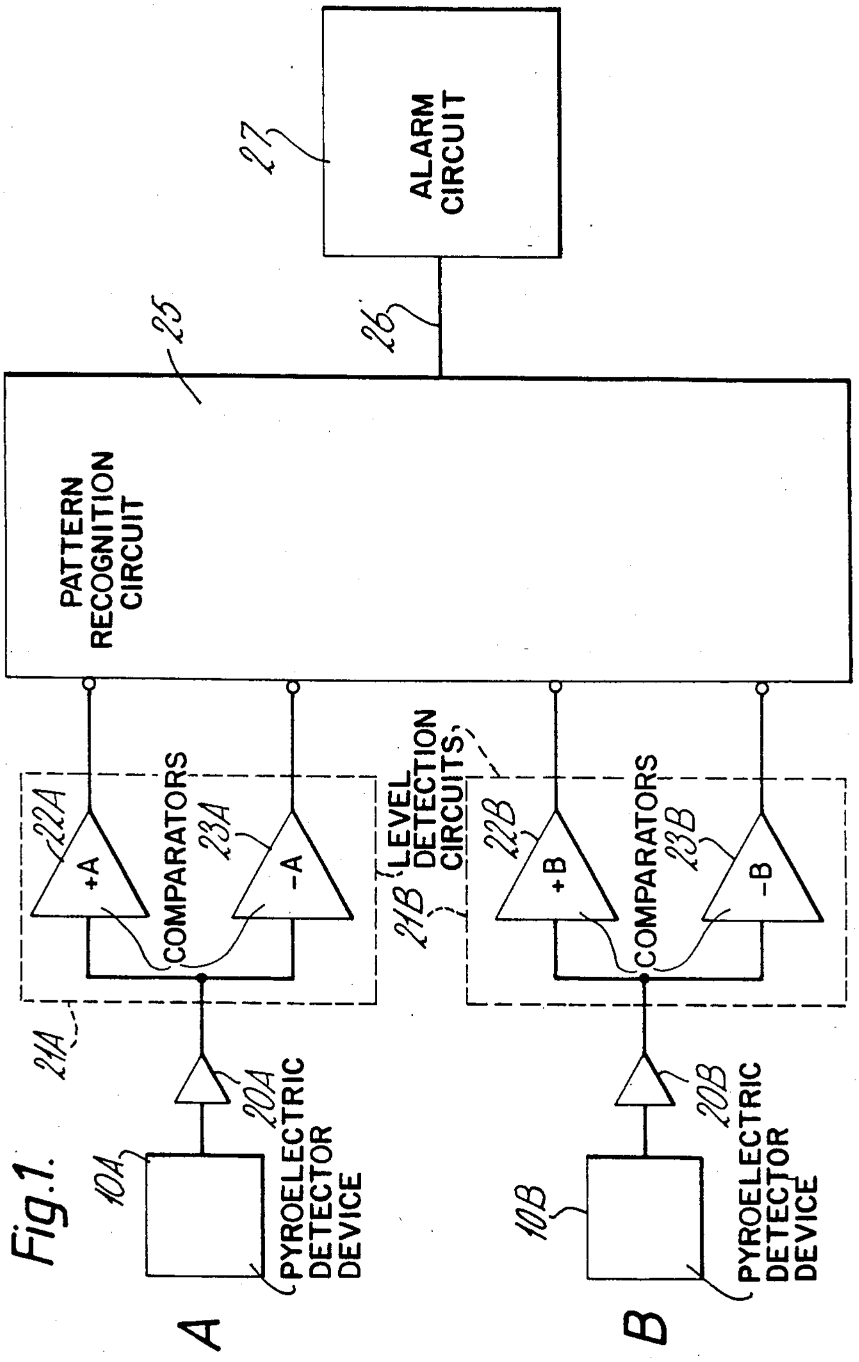
FIG. 1 is a schematic block diagram of the system.

Referring to FIG. 1, the system has two channels, designated A and B, each of which includes a so-called "dual" pyroelectric detector device, 10A and 10B. As can be seen from FIG. 2, the detector devices each comprise a pair of pyroelectric elements, 11*a* and 12*a*, and 11*b* and 12*b*, formed from separate bodies of pyroelectric materials (such as lanthanum and manganese doped lead zirconate titanate) sandwiched between two nichrome electrodes disposed on opposing major surfaces thereof. The uppermost electrodes are substantially transmissive to infrared radiation in a wavelength range to be detected. Unwanted radiation wavelengths may be filtered out.

The fabrication of the detector devices is well known and as such is not described herein in detail.

Figure 2:
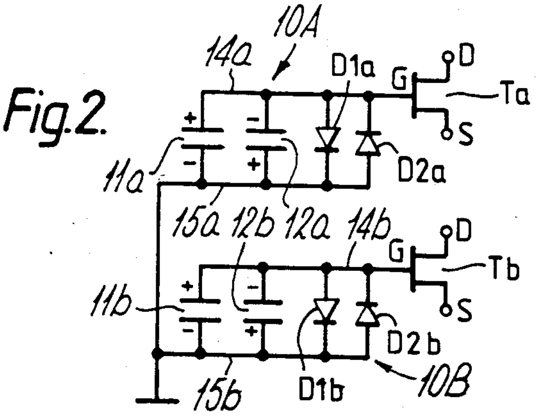
FIG. 2 is a schematic circuit diagram of two, interconnected pyroelectric detector devices of the system shown in FIG. 1.

FIG. 2 shows the circuit of the detector devices 10A and 10B. As is conventional, the pyroelectric elements are represented in FIG. 2 as capacitors and their poling directions are indicated by the usual signs. The two pyroelectric elements 11*a* and 12*a*, and 11*b* and 12*b*, of each detector device are electrically connected in parallel opposition between lines 14*a* and 15*a*, and 14*b* and 15*b*. Lines 15*a* and 15*b* are connected together to ground. A differential output from each associated pair of elements is obtained along lines 14*a* and 14*b*, respectively.

The lines 14*a* and 14*b* are connected respectively, to the gates of field effect transistors Ta and Tb. Two low leakage diodes D1*a* and D2*a*, and D1*b* and D2*b*, are connected in parallel-opposition between the gates of transistors Ta and Tb and lines 15*a* and 15*b*, respectively.

For more detailed information about the circuit of each detector device, reference is made to U.K. Patent Specifications Nos. 1580403 and 2046431B. Briefly, it can be said that the diode arrangement of each device protects the gate of its associated field effect transistor (which forms part of an impedance matching circuit) from excessive voltages and limits the pyroelectric voltage resulting from large changes in ambient temperature.

In operation, voltages produced across the two elements of each device, for example 11*a* and 12*a*, as a result of the same temperature change to both elements due to the same radiation change in the fields of view of both elements will cancel one another out because they are connected differentially. On the other hand, when the change in temperature of one element as determined by the change in radiation in the field of view of that one element is not accompanied by a corresponding change in temperature of the other element as determined by the change in radiation in the field of view of the other element, a differential output voltage is created at the gate of the associated transistor T. The use of such dual detector devices in intruder detection systems is highly beneficial as, for example, fluctuations in the thermal state of the background scene and acoustic noise produce no effective output from the device, thus eliminating "environmental noise" and providing some protection against false triggering in the system.

Figure 3:
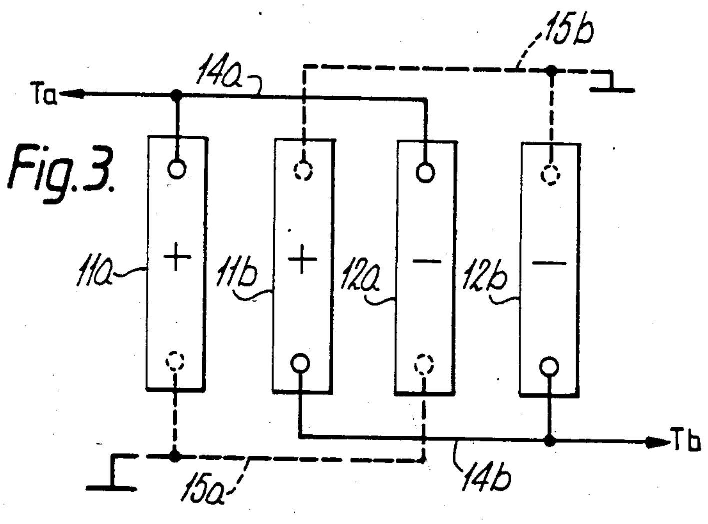
FIGS. 3 and 4 are partly schematic, partly plan views of alternative arrangements of the pyroelectric elements of the detector devices of FIG. 2.

The pyroelectric elements of the two detector devices 10A and 10B may be arranged parallelly as shown in FIG. 3 in a linear array with one element of one device disposed between the two, spaced, elements of the other device. The elements have generally rectangular radiation-receiving sensitive areas of substantially equal size, around 2 mm×0.6 mm. Adjacent elements are closely spaced, around 0.2 mm apart (this spacing is shown exaggerated in FIG. 3) so that, as an infrared image traverses the elements transverse to the linear array, the delay between the response of one element to that image and the response from the adjacent element is minimized.

Figure 4:
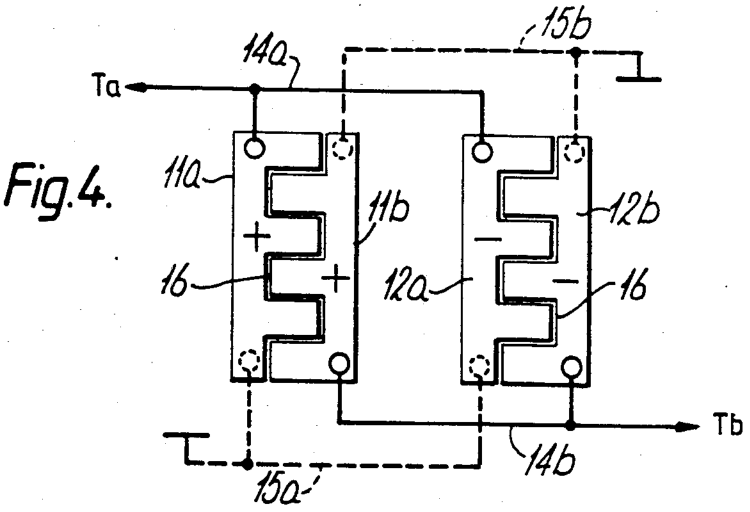

Alternatively, the elements of the two devices may be shaped with fingers and arranged interdigitated as shown in FIG. 4. The fingers are parallel to the fingers of respective ones of the elements of each device. The fingers project generally parallel to the direction of travel of the intruder image. The elements again have substantially equal radiation receiving sensitive areas, being around 2.5 mm long by 1 mm wide overall.

The interdigitated elements are separated by a small meandering gap 16 of around 0.05 to 0.125 mm. The two elements of each dual device are spaced apart by around 1 mm. In this way, each pair of interdigitated elements, for example 11*a* and 11*b*, occupy a substantially common area so that they are able to respond to a moving infrared image directed thereon very nearly at the same point in time. The construction of such interdigitated dual detector devices is described in greater detail in U.K. Patent Application No. 8503240.

Referring again to FIG. 1, the source terminals of the transistors Ta and Tb form the outputs of the detector devices 10A and 10B of channels A and B respectively. These detector outputs are connected via suitable preamplifier and amplifier stages 20A and 20B to inputs of level detection circuits 21A and 21B, respectively. Each level detection circuit 21A and 21B comprises two comparators 22A and 23A, and 22B and 23B employed as positive and negative threshold level detectors. The pairs of comparators 22A and 23A, and 22B and 23B make up a window comparator.

The level detection circuits 21A and 21B are responsive to voltage excursions of predetermined magnitude and of either polarity from the amplifier stages 20A and 20B to produce a specific digital output, namely a logic "one" output pulse at the appropriate comparator output terminal. The normal quiescent logic of the comparators is a logic "zero" voltage signal.

The operation of the level detection circuits 21A and 21B is as follows. Considering the case where an intruder is moving across the field of view of the detector devices 10A and 10B, as the infrared radiation image of the intruder first moves onto a pyroelectric element of detector device 10A, a voltage of a first polarity is developed across that element. This voltage is amplified by the amplifier stage 20A and is fed to the inputs of both comparators of the level detection circuit 21A.

A sufficiently large change in temperature of that element, as would be expected in the case of an intruder's infrared image, will result in an amplified voltage signal exceeding the predetermined voltage level of, say, the positive voltage excursion comparator 22A so that the comparator 22A is triggered and a logic "one" output is produced thereby. The duration of the logic "one" output corresponds with the period for which the voltage output from the detector device exceeds the present level of the comparator. As the infrared image moves off that element, a similar voltage of opposite polarity will be developed which this time exceeds the predetermined voltage of the other, negative voltage excursion comparator 23A. Comparator 23A responds by producing a logic "one" at its output.

Similarly, as the infrared image moves onto the adjacent pyroelectric element of detector device 10B, a logic "one" is produced by comparator 22B, assuming again the image causes sufficient temperature change in that element. As the image moves off that element of detector device 10B, comparator 23B produces a logic "one" output.

Thus, the level detection circuits 21A and 21B serve as discriminators to distinguish intruder-indicative outputs from the detector devices 10A and 10B from unwanted, comparatively low-level voltage excursions resulting from, for example, internal or extraneous noise. As the image moves further across the detector devices 10A and 10B, it will encounter the adjacent, second pyroelectric elements of the devices to produce an inverse, second series of outputs from the comparators, since the pyroelectric material of those elements is poled in the opposite direction.

The logic "one" outputs of the comparators 22A, 23A, 22B, 23B are hereinafter designated +A, −A, +B, −B, respectively, for simplicity.

In response to an intruder moving in one direction across the field of view of detector devices 10A and 10B, therefore, the outputs from the comparators 22A, 23A, 22B, 23B (as the intruder's image passes onto an element of device 10A and then onto an element of device 10B to produce a voltage output from each device of certain duration) would for example be +A followed directly by +A together with +B followed directly by +B. The output signals of 22A and 22B partly overlap because the adjacent pyroelectric elements of devices 10A and 10B are spaced closely together. As a result, the intruder's image will reach an element of device 10B very soon after the adjacent element of device 10A, and within the duration of the output signal from comparator 22A.

The four outputs of the level detection circuits 21A and 21B are connected to a pattern recognition signal processing circuit 25. Circuit 25 comprises electronic logic circuits which are arranged to identify patterns (that is, sequences of output signals from the level detection circuits 21A and 21B indicative of an intruder crossing the detector devices fields of view) and respond thereto to produce an output. This output is, in turn, supplied along line 26 to an alarm and/or switching relay circuit 27. Circuit 27 generates an alarm and/or operates switches, for example lighting switches, accordingly.

The circuit arrangement 25 is designed to identify and respond to the aforementioned pattern of comparator output signals, that is, +A, followed by +A together with +B (resulting from partly overlapping output signals), followed by +B, and also, for increased security, the inverse thereof, namely −A, followed by −A together with −B, followed by −B. These output signals are provided in response to the opposite polarity outputs from the detector devices as the image moves off their respective elements.

To allow for the fact that an intruder may move in the opposite direction, the circuit arrangement 25 is also arranged to respond to the reverse of the aforementioned patterns, that is, either +B, followed by +B together with +A, followed by +A, or −B followed by −B together with −A, followed by −A.

The circuit arrangement 25 is further arranged to recognize, and respond to, additional patterns of output signals from the level detection circuits 21A and 21B. More precisely, the circuit arrangement 25 is designed to respond to additional output signal patterns comprising either the sequence +A, followed directly by +A together with +B, followed by +A again, or the sequence −A, followed directly by −A together with −B, followed directly by −A again. It has been found that by arranging the circuit arrangement 25 to identify and respond to these additional patterns the system is able to detect intruders even more reliably.

In comparative tests between a system arranged to respond to the first-mentioned signal patterns alone and a system arranged to respond to these additional patterns as well, the former system, while having improved detection capability over the earlier known system, could on certain remote occasions fail to successfully identify intruder-like inputs. The latter system, however, had an even higher success rate. Both systems had a generally similar performance as regards false triggering events in response to non-intruder like inputs. This suggests that the additional patterns of signals looked for in the latter system, may be considered as associated uniquely with intruder-like inputs. When used in conjunction with the first-mentioned patterns, the latter patterns are advantageous in identifying intruders, although the precise reason for this is not entirely clear.

So as to allow for detection of intruders moving in the opposite direction, the circuit arrangement 25 is further arranged to identify and respond to the reverse of the additional patterns of output signals from the level detection circuits 21A and 21B mentioned above, that is, either the sequence +B, followed by +B together with +A, followed by +B again, or −B, followed by −B together with −A, followed by −B again.

Tests were carried out using the above described system with the view to attempting to identify uniquely shock-induced output signal patterns indicative of the detector devices 10A and 10B having been subjected to mechanical shock. As is well known, mechanical shock causes output voltages to be developed These tests have shown that combinations of output signals from the level detection circuits 21A and 21B comprising either −A together with +B, or +A together with −B can prove suitable for such identification purposes. Using this finding, the circuit arrangement 25 is further arranged to look for these shock-related induced combinations of output signals. Upon their detection, the generation of an output therefrom is inhibited.

The circuit arrangement 25 includes a timer circuit which defines a timing period window following the first of a sequence of output signals from the level detection circuits 21A and 21B. If during the duration of this timing period one of the intruder-indicative patterns of output signals is detected, an output from the circuit arrangement 25 is supplied to the alarm and/or relay switching circuit 27. If, on the other hand, the timing period expires before detection of an intruder-indicative pattern is completed, the output from the circuit arrangement is inhibited.

The duration of the timing period is pre-selected in dependence upon such parameters as the expected time taken normally for an intruder's image to pass over the detector devices 10A and 10B. This time is dependent on, for example, the anticipated distance and speed of the intruder, the size of the image presented to the devices, and the mutual spacing of the pyroelectric elements in the devices. In one embodiment of the invention, using interdigitated elements as described above, a timing duration of around 2.5 seconds has been found to be satisfactory.

Figure 5:
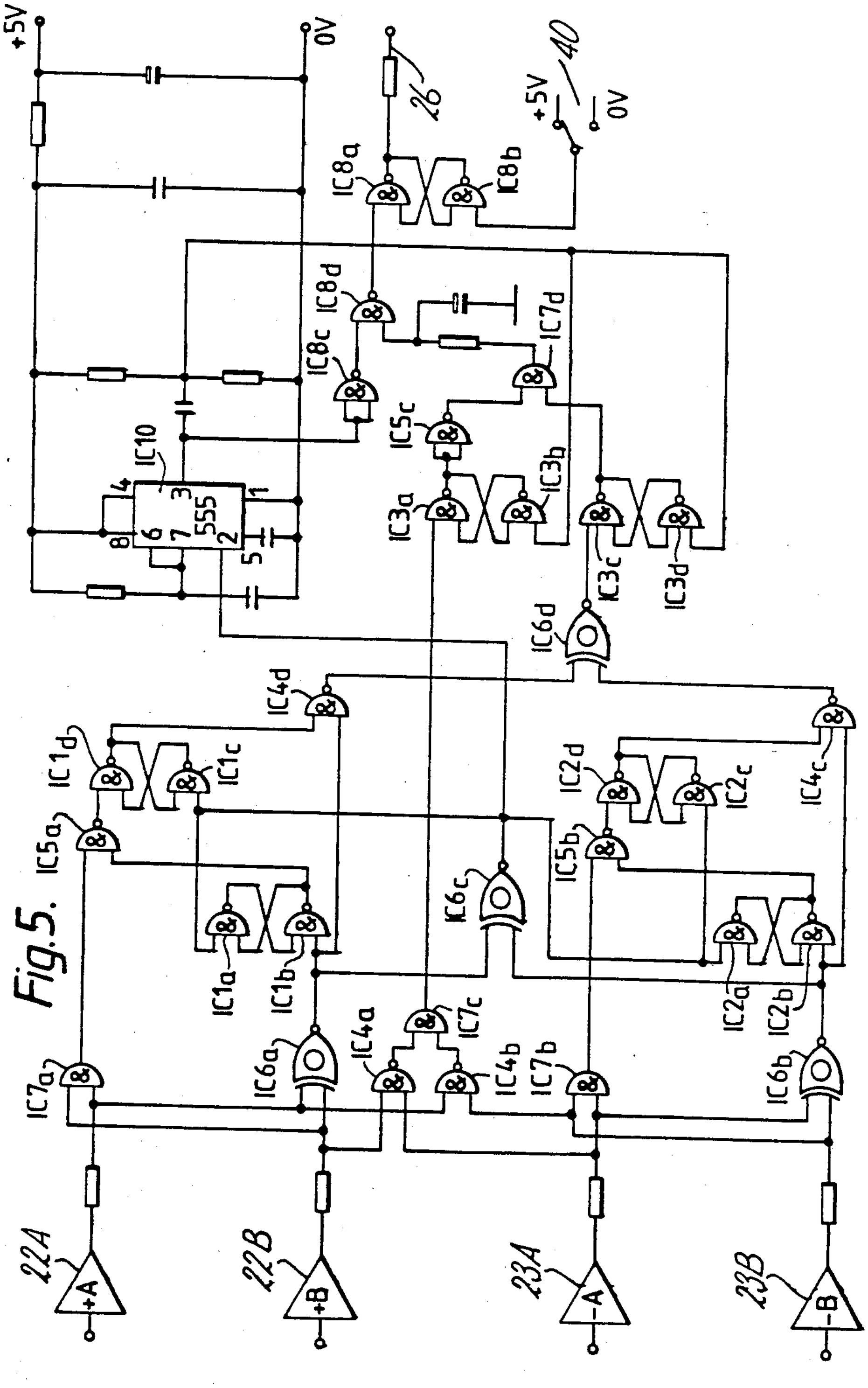
FIG. 5 is a schematic diagram of a circuit forming part of the system.

FIG. 5 shows the circuit arrangement 25, connected to comparators 22A, 23A, 22B and 23B, in greater detail. With regard to the logic circuit shown, it is believed that its operation will be readily apparent to those skilled in the art and for this reason only a brief description will be given. The individual logic gates of this circuit form parts of an integrated circuit. There are eight integrated circuits in all, which are designated IC1 through IC8. Individual gates thereof are suffixed with a lower case letter.

The output of comparator 22A is fed, via a resistor, to one input of AND gate IC7*a* whose other input is connected to the output of comparator 22B. The outputs of both these comparators are also connected to respective inputs of EXCLUSIVE OR gate IC6*a*.

The output of gate IC6*a* is supplied to an input of a flip flop comprising NAND gates IC1*a* and IC1*b*. The flip flop output, together with the output of gate IC7*a* form inputs of NAND gate IC5*a*.

The output of gate IC5*a* is connected to an input of a flip flop comprising NAND gates IC1*d* and IC1*c*. The output of this flip flop is supplied to NAND gate IC4*d*. The other input of this gate is connected to the output of gate IC6*a*. Respective inputs of IC1*c* and IC1*d* are both connected to the output of EXCLUSIVE OR gate IC6*c*, one input of which is connected to the output of gate IC6*a*.

The outputs of comparators 23A and 23B are likewise connected, via respective resistors, through a similar logic circuit comprising gates IC7*b*, IC6*b*, IC2*a*, IC2*b*, IC5*b*, IC2*d*, IC2*c*, IC4*c* and IC6*c*. IC6*c* is shared.

Gate IC6*c*, being supplied through gates IC6*a* and IC6*b* serves to detect any individual comparator transition from its quiescent state. Its output serves on the one hand to reset the flip flops constituted by IC1*a* and IC1*b*, IC1*d* and IC1*c*, IC2*a*, and IC2*b*, and IC2*d* and IC2*c*, respectively, and, on the other hand, to initiate operation of a conventional timing circuit comprising a 555 type timer IC10. The output of the timing circuit is supplied through an inverting gate IC8*a* to one input of NAND IC8*d*. The output of gate IC8*d* in turn is connected to an input of a flip flop constituted by NAND gates IC8*a* and IC8*b*. The flip flop output is connected, via a resistor, to line 26.

The outputs of NAND gate IC4*d* and IC4*c* are connected to the inputs of EXCLUSIVE OR gate IC6*d*. The output of this gate is fed to an input of a flip flop comprising NAND gates IC3*c* and IC3*d*. The reset input and output, respectively, of this flip flop are connected with the output of the timing circuit and to the input of AND gate IC7*d*. The output of gate IC7*d* is fed via a resistor/capacitor holding circuit to the other input of gate IC8*d*.

The outputs of comparators 22B and 23A and 22A and 23B, respectively, are supplied to NAND gates IC4*a* and IC4*b*. The outputs of these two gates are supplied to a further AND gate IC7*c*. The output of gate IC7*c* is connected to the input of a flip flop constituted by IC3*a* and IC3*b*. The reset input of this flip flop is connected to the output of the timing circuit. Its output is connected through inverting gate IC5*c* to the other input of IC7*d*.

In use, the components IC1, IC4*d*, IC6*a*, IC7*a* and IC5*a* of the logic circuit serve to detect output signal patterns from the comparators comprising either +A, followed by +A together with +B, followed by +B, or +B, followed by +B together with +A, followed by +A, or +A, followed by +A together with +B, followed by +A, or +B, followed by +A together with +B, followed by +B. If any of these patterns are detected, an output is provided by IC4*d* accordingly.

The components IC2, IC4*c*, IC6*b*, IC7*b* and IC5*b* of the logic circuit operate in a similar fashion to detect the following patterns of output signals from the comparators:

−A, followed by −A together with −B, followed by −B, or −B, followed by −A together with −B, followed by −A, or −A, followed by −A together with −B, followed by −A, or −B, followed by −A together with −B, followed by −B. If any of these patterns are detected, an output is provided by IC4*c* accordingly.

The components IC3*c*, IC3*d* and IC6*d* look for outputs from either IC4*d* and IC4*c* indicative of any of the above mentioned sequences having been detected and provides an input to IC7*d* in accordance therewith.

The components IC4*a*, IC4*b*, IC7*c*, IC3*a*, IC3*b* and IC5*c* serve to detect the particular combinations of output signals from the comparators indicative of mechanical shock, namely either −A together with +B, or +A together with −B. If such a combination is detected, the output of IC5*c* prohibits gate IC7*d* from providing an output indicative of one of the predetermined patterns having been detected. If the gate IC7*d* is not so prohibited, and if one of the aforementioned intruder-related patterns is detected, and in dependence on the output of the timing circuit as will be described, gate IC7*d* generates an intruder signal. NAND gates IC8*d* and IC8*a* to provide an output along line 26 then the alarm and/or switching relay circuit 27 so as to cause an alarm to be generated or switches to be actuated.

As previously mentioned, IC6*c* detects any individual comparator transition and acts to trigger the timer IC10 of the timing circuit. IC10 thereupon supplies a timing signal, inverted by gate IC8*c*, to gate IC8*d* for a predetermined duration of around 2.5 seconds. The gates IC7*d* and IC8*a* enable an output to be provided along line 26 if, within 2.5 seconds after the first comparator transition, one complete intruder-indicative pattern of output signals is detected (providing that no mechanical shock indicative combinations of output signals to observed).

Following the generation of an alarm output, the flip flop constituted by IC8*a* and IC8*b* may be reset by manual actuation of switch 40.

It is envisaged that the various gates and timing circuit may be implemented in a semi-custom integrated circuit.

By utilizing pattern recognition signal processing in the manner described, the system provides greater immunity from false triggering, while also offering improved intruder detection capability. The use of detector devices having interdigitated pyroelectric elements is particularly attractive since it enables the selected timing period, and thus the risk of false triggering caused by random noise, to be reduced to a minimum as a result of the adjacent, interdigitated elements occupying more or less the same sensing area and therefore being able to respond almost simultaneously to an incoming radiation image.

A multi-segment mirror, not shown in the drawings, may be used to collect incoming infrared radiation and to focus the radiation on the detector devices. Each segment of the mirror has its own, discrete field of view. In this way, as an intruder moves through the field of view of each mirror segment, a separate image is focussed onto the elements of the devices so that a series of output signal sequences are produced by the comparators for multiple triggering.

In an alternative arrangement, multi-faceted lenses may be used instead. The use of mirrors or lenses ensure a well-focussed image and acceptable operating range.

In the described embodiment each dual detector device has two differentially connected pyroelectric elements, in order to provide immunity from common mode signal producing effects (such as those generated by variations in ambient temperature, background radiation and noise). In another embodiment of the invention, the system may have detector devices comprising single pyroelectric elements. The elements of the two devices are either arranged closely adjacent one another or are interdigitated in a similar manner to that described above.

We claim:

1. An infrared intruder detection system comprising:
- a first means for sensing infrared radiation incident on a first location, said first infrared-sensing means producing either a positive or negative output signal +A or −A in response to the infrared radiation sensed;
- a second means for sensing infrared radiation incident on a second location spaced from the first location, said second infrared-sensing means producing either a positive or a negative output signal +B or −B in response to the infrared radiation sensed; and
- sequence detection means for receiving the output signals from the first and second means for sensing infrared radiation, and for producing an alarm output indicating the presence of an intruder when an output signal sequence of +A followed by +A and +B, followed by +B is detected, or when an output signal sequence of −A, followed by −A and −B, followed by −B is detected.

2. An infrared intruder detection system as claimed in claim 1, characterized in that the sequence detection means also produces an alarm output indicating the presence of an intruder when an output signal sequence of +B followed by +A and +B, followed by +A is detected, or when an output signal sequence of −B, followed by −A and −B, followed by −A is detected.

3. An infrared intruder detection system as claimed in claim 2, characterized in that the sequence detection means also produces an alarm output indicating the presence of an intruder when an output signal sequence of +A followed by +A and +B, followed by +A is detected, or when an output signal sequence of −A, followed by −A and −B, followed by −A is detected.

4. An infrared intruder detection system as claimed in claim 3, characterized in that the sequence detection means also produces an alarm output indicating the presence of an intruder when an output signal sequence of +B, followed by +A and +B, followed by +B is detected, or when an output signal sequence of −B, followed by −A and −B, followed by −B is detected.

5. An infrared intruder detection system as claimed in claim 4, characterized in that the sequence detection means will not produce an alarm output indicating the presence of an intruder when an output signal sequence of −A and +B is detected, or when an output signal sequence of +A and −B is detected.

6. An infrared intruder detection system as claimed in claim 5, characterized in that the system further comprises means for defining a timing period window within which the sequence detection means must detect a selected output signal sequence in order to produce an alarm output.

7. An infrared intruder detection system as claimed in claim 6, characterized in that the first and second locations are interdigitated.

8. An infrared intruder detection system as claimed in claim 7, characterized in that each means for sensing infrared radiation comprises a pyroelectric dual detector having differentially-connected pyroelectric elements.

9. An infrared intruder detection system as claimed in claim 8, characterized in that the four elements of the two dual detectors are arranged in a line.

10. An infrared intruder detection system as claimed in claim 9, characterized in that the system further comprises means for generating an alarm in response to the alarm output of the sequence detection means.

11. An infrared intruder detection system as claimed in claim 9, characterized in that the system further comprises means for operating a switch in response to the alarm output of the sequence detection means.

* * * * *